H. L. HUBBARD.
WIRE WHEEL CONSTRUCTION.
APPLICATION FILED OCT. 3, 1916.
1,223,977.
Patented Apr. 24, 1917.
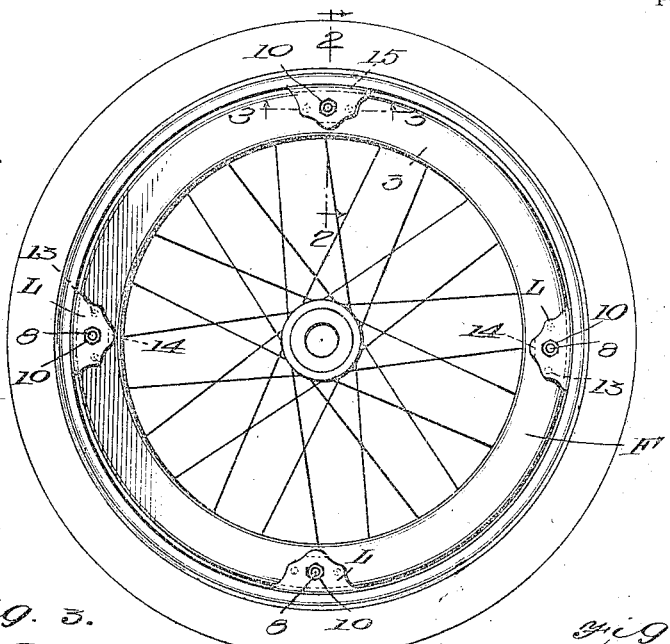
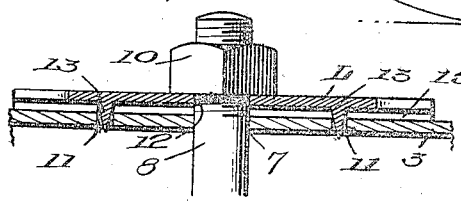
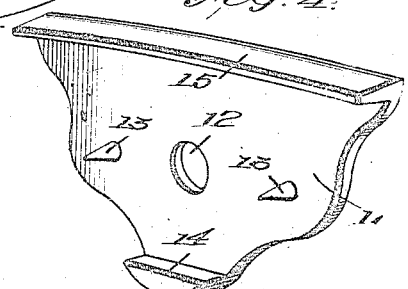
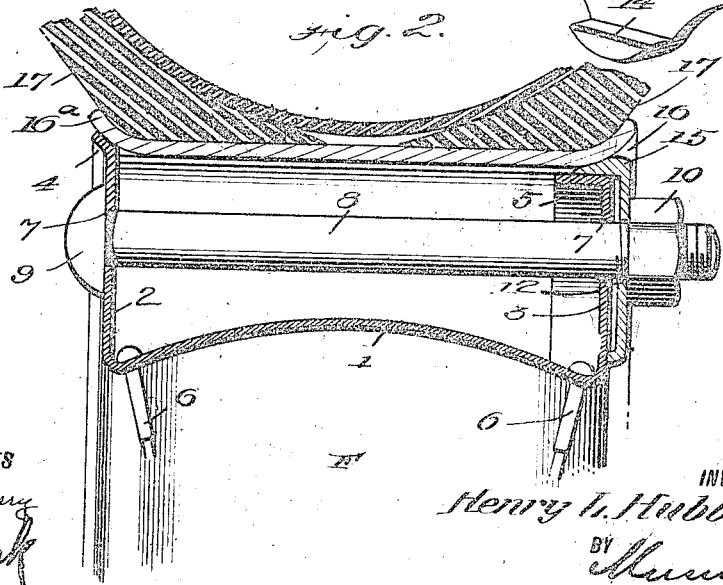
WITNESSES
INVENTOR
Henry L. Hubbard
BY
ATTORNEYS

UNITED STATES PATENT OFFICE.

HENRY L. HUBBARD, OF CLEVELAND, OHIO.

WIRE WHEEL CONSTRUCTION.

1,223,977.

Specification of Letters Patent.     Patented Apr. 24, 1917.

Application filed October 3, 1916. Serial No. 123,460.

*To all whom it may concern:*

Be it known that I, HENRY L. HUBBARD, a citizen of the United States, and a resident of Cleveland, in the county of Cuyahoga and State of Ohio, have invented a certain new and useful Improvement in Wire Wheel Construction, of which the following is a specification.

My invention relates to improvements in wire wheel constructions, and it consists in the combinations, constructions and arrangement of parts as hereinafter described and claimed.

An object of my invention is to provide a wire wheel construction which will enable the use of a demountable rim, so that an automobile or similar vehicle using wire wheels need not carry an extra wheel at all, since an extra rim may be fitted to any of the wheels, the latter being permanently fixed to the vehicle.

A further object of my invention is to provide a wire wheel construction making use of a pressed steel fixed rim.

A further object of my invention is to provide novel clamping lugs having devices arranged to engage the fixed rim for permitting play of the lugs, while at the same time permitting the free movement of the lugs into and out of clamping position.

Other objects and advantages will appear in the following specification, and the novel features of the invention will be particularly pointed out in the appended claims.

My invention is illustrated in the accompanying drawings, in which:—

Figure 1 is a side view of a wheel constructed in accordance with my invention;

Fig. 2 is an enlarged section on the line 2—2 of Fig. 1;

Fig. 3 is a section through a clamping lug; and

Fig. 4 is a perspective view of a clamping lug.

In carrying out my invention, I provide a fixed rim, which is made preferably of pressed steel. As will be seen from Fig. 2, this fixed rim consists of a body portion 1, preferably arc-shaped in cross section, and having integral sides 2 and 3. The side portion 2 is provided with an outwardly flaring flange 4, while the side 3 is bent at right angles to form a flange 5. The spokes 6 are secured to the body portion as shown in Fig. 2. The fixed rim which I have denoted in general by F, is provided with openings 7 in the sides 2 and 3 for bolts 8. The heads 9 of the bolts bear against the side 2 while the opposite ends of the bolts are threaded to receive nuts 10. On opposite sides of the openings 7 are openings 11.

The lugs which clamp the demountable rim to the fixed rim, as shown in Fig. 4, each consists of a body portion L having an opening 12 arranged to receive the bolt 8 being provided with a pair of tapered pins or studs 13 arranged to enter the openings 11, as shown in Fig. 3. This clamping lug is also provided with a flange 14 arranged to engage the said side 3 of the fixed rim and with an elongated flange 15 adapted to enter between the portion 5 and the demountable rim 16, so as to hold the latter securely upon the fixed rim.

From the foregoing description of the various parts of the device, the operation thereof will be readily understood. The demountable rim 16 bearing the tire 17 is placed over the fixed rim, the lugs L being turned to permit the demountable rim to be slipped on the fixed rim. The curved portion 16ª of the demountable rim will bear on the flange 4. The lugs are now turned, into the position shown in Fig. 2, and the nuts 10 are tightened up, drawing the flange 15 in between the bearing member 5 and the demountable rim 16 and thus firmly securing the rim in position. The lugs or pins 13, in the meantime, have entered the openings 11, so that any lateral movement is prevented. The flange 14 bears on the side 3, as stated, so that in drawing up on the nut 10, the edge will be forced into position to firmly secure the demountable rim to the fixed rim.

It will be seen that I have provided a device which obviates the necessity of carrying an extra wire wheel. The construction of the fixed rim does not interfere at all with the replacing of spokes, because when the demountable rim has been detached, one has immediate access to the heads of the spokes through the outer portion of the fixed rim which is open. The bearing portions 4 and 5 of the fixed rim are entirely sufficient to support the demountable rim.

The fact that the clamping lug L is held securely from lateral motion by means of the pins 13, obviates the necessity of having as many clamping lugs as are necessary in the ordinary construction. Four clamping lugs are entirely sufficient. It will be noted that these lugs are extraordinarily wide.

The flange 15 is curved of course, to conform to the curvature of the demountable rim and fixed rim.

The clamping lugs may be quickly removed or loosened, so that they may be turned out of engagement with the demountable rim just as readily as if the means for preventing the lateral movement were not present, since the studs or pins 13 are merely withdrawn from the holes or sockets in the side member 3 of the fixed rim.

A wheel constructed in accordance with my invention may be fixed permanently to the vehicle, and the tires on their rims may be as readily secured in place, or taken off, as with the ordinary demountable rim on wood wheels.

I claim:

1. In a wheel construction, a fixed rim consisting of a single piece of pressed steel, said fixed rim being preferably U-shaped in cross section and having a supporting flange at the extremity of each of the side portions, a circular demountable rim having one edge arranged to engage one of said flanges, means for wedging the other side of the demountable rim, said means comprising bolts arranged to extend through the sides of the fixed rim, and clamping lugs each having an edge arranged to enter between the demountable rim and one of said flanged portions of the fixed rim, and means for preventing a rotary movement of the clamping lugs about their bolts, said last named means comprising pins or studs secured to each lug on opposite sides of the bolts and arranged to enter corresponding openings in the fixed rim.

2. In a wheel construction, a fixed rim consisting of a single piece of pressed steel of substantially U-shaped cross section, one of the sides of the fixed rim having an outwardly flaring flange, the other side having an annular flange, bolts arranged to pass through both sides of said fixed rim, clamping lugs each having an opening arranged to receive the bolts, said lugs being provided with a shoulder at one end arranged to engage the side of the fixed rim and being provided at the opposite end with an elongated wedge-shaped flange, said clamping lugs having a retaining pin on each side of said bolt openings arranged to enter corresponding openings in one of the sides of said fixed rim, and nuts for forcing said clamping lugs into clamping position.

HENRY L. HUBBARD.